(12) United States Patent
Singh (10) Patent No.: US 11,831,665 B2
(45) Date of Patent: Nov. 28, 2023

(54) DEVICE FOR MONITORING A SIMULATED ENVIRONMENT

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 278 days.

(21) Appl. No.: 17/140,862

(22) Filed: Jan. 4, 2021

(65) Prior Publication Data
US 2022/0217168 A1 Jul. 7, 2022

(51) Int. Cl.
| | |
|---|---|
| H04L 9/40 | (2022.01) |
| G06T 7/73 | (2017.01) |
| G06T 7/40 | (2017.01) |
| G06T 7/90 | (2017.01) |
| G06F 3/01 | (2006.01) |
| G06T 15/08 | (2011.01) |
| G06V 10/56 | (2022.01) |

(52) U.S. Cl.
CPC .......... *H04L 63/1425* (2013.01); *G06F 3/011* (2013.01); *G06T 7/40* (2013.01); *G06T 7/73* (2017.01); *G06T 7/90* (2017.01); *G06T 15/08* (2013.01); *G06V 10/56* (2022.01)

(58) Field of Classification Search
CPC ....... G06F 3/011; G06T 15/08; H04L 63/1425
See application file for complete search history.

(56) References Cited

U.S. PATENT DOCUMENTS

| | | |
|---|---|---|
| 10,812,152 B1 | 10/2020 | Qu et al. |
| 10,812,703 B2 | 10/2020 | Wang et al. |
| 10,816,752 B2 | 10/2020 | Wang et al. |
| 10,816,807 B2 | 10/2020 | Polcak et al. |
| 10,817,066 B2 | 10/2020 | Ross et al. |
| 10,818,095 B2 | 10/2020 | Rogers |
| 10,818,097 B2 | 10/2020 | Chapman et al. |
| 10,819,645 B2 | 10/2020 | Westphal et al. |
| 10,819,946 B1 | 10/2020 | Tanumihardja et al. |
| 10,819,966 B2 | 10/2020 | Alaniz et al. |
| 10,824,224 B2 | 11/2020 | Kim et al. |
| 10,825,049 B2 | 11/2020 | Achhra et al. |

(Continued)

*Primary Examiner* — Benjamin C Lee
*Assistant Examiner* — Nathan P Brittingham (57) ABSTRACT

A simulated environment presentation device with a display configured to present a rendering of a simulated environment. A simulated environment subsystem is communicatively coupled to the simulated environment presentation device and is configured to provide instructions for rendering the simulated environment. A simulated environment monitoring device includes at least one processor communicatively coupled to the simulated environment subsystem. The simulated environment monitoring device monitors the rendering of the simulated environment over a period of time. Features associated with objects presented in the rendering of the simulated environment are determined over the period of time. An anomaly associated with a first object is detected based on a change in a determined first feature of the first object over the period of time. The simulated environment monitoring device then causes the simulated environment subsystem to modify the rendering of the simulated environment to identify the first object as an anomalous object.

17 Claims, 5 Drawing Sheets

(56) References Cited

U.S. PATENT DOCUMENTS

| | | | |
|---|---|---|---|
| 10,825,261 B2 | 11/2020 | Jiang | |
| 10,825,350 B2 | 11/2020 | Ni | |
| 10,827,233 B2 | 11/2020 | DeFaria et al. | |
| 10,832,477 B2 | 11/2020 | Bailey et al. | |
| 10,832,490 B2 | 11/2020 | Jung | |
| 10,838,210 B2 | 11/2020 | Robaina et al. | |
| 10,838,486 B2 | 11/2020 | Gonzalez Franco et al. | |
| 10,839,572 B2 | 11/2020 | Church | |
| 10,841,347 B2 | 11/2020 | Miller | |
| 2013/0047217 A1* | 2/2013 | Shuster | G06F 40/14 726/4 |
| 2017/0213473 A1* | 7/2017 | Ribeira | G09B 5/10 |
| 2018/0167402 A1* | 6/2018 | Scheidler | G06N 20/00 |
| 2018/0189973 A1 | 7/2018 | Cole et al. | |
| 2018/0292899 A1 | 10/2018 | Lee et al. | |
| 2018/0342054 A1* | 11/2018 | Wagstaff | G06F 3/013 |
| 2019/0158523 A1* | 5/2019 | Ghosh | G06F 9/45545 |
| 2019/0339516 A1 | 11/2019 | Zhang | |
| 2019/0362156 A1* | 11/2019 | Muppala | G06V 20/46 |
| 2020/0104522 A1* | 4/2020 | Collart | G06T 19/20 |
| 2020/0128054 A1* | 4/2020 | Miller | G06F 3/013 |
| 2020/0265648 A1 | 8/2020 | Thornbury et al. | |
| 2020/0265652 A1 | 8/2020 | Jung | |
| 2020/0273092 A1 | 8/2020 | Wilson et al. | |
| 2020/0279407 A1 | 9/2020 | Liljeroos et al. | |
| 2020/0293106 A1 | 9/2020 | Lusinchi | |
| 2020/0293112 A1 | 9/2020 | Richter et al. | |
| 2020/0293166 A1 | 9/2020 | Timonen et al. | |
| 2020/0302573 A1 | 9/2020 | Liu et al. | |
| 2020/0306634 A1 | 10/2020 | Gordt | |
| 2020/0310531 A1 | 10/2020 | Davis et al. | |
| 2020/0341544 A1 | 10/2020 | Perlin et al. | |
| 2020/0341550 A1 | 10/2020 | Giordano | |
| 2020/0342805 A1 | 10/2020 | Li et al. | |
| 2020/0344131 A1 | 10/2020 | Barton et al. | |
| 2020/0344462 A1 | 10/2020 | Deshpande | |

* cited by examiner

DEVICE FOR MONITORING A SIMULATED ENVIRONMENT

TECHNICAL FIELD

The present disclosure relates generally to simulated environments, more specifically to a device for monitoring a simulated environment.

BACKGROUND

A simulated, or virtual reality, environment may mimic the real world or be designed to provide another user experience. For example, simulated environments may be used to approximate real-life environments for a variety of purposes, such as for shopping, or the like. A user may provide appropriate inputs to a device presenting the simulated environment, such as a virtual reality device, to simulate the experience of moving about the simulated environment and, in some cases, the experience of interacting with objects presented in the simulated environment.

SUMMARY

In one embodiment, a system includes a simulated environment presentation device with a display configured to present a rendering of a simulated environment. A cloud-based simulated environment subsystem is communicatively coupled to the simulated environment presentation device and is configured to provide instructions for rendering the simulated environment. A simulated environment monitoring device includes at least one processor communicatively coupled to the cloud-based simulated environment subsystem. The simulated environment monitoring device monitors the rendering of the simulated environment over a period of time. Object features associated with objects presented in the rendering of the simulated environment are determined over the period of time. An anomaly associated with a first object is detected based on a change in a determined first feature of the first object over the period of time. In response to detecting the anomaly associated with the first object, the simulated environment monitoring device causes the cloud-based simulated environment subsystem to modify the rendering of the simulated environment to identify the first object as an anomalous object.

Advancements in virtual reality display devices have prompted a recent increase in the use of simulated environments, for example, for interactive applications. While the use of simulated environments has increased, little or no attention has focused on the vulnerabilities of simulated environments to manipulation and/or compromise by bad actors. For example, a bad actor may mimic or alter all or a portion of a simulated environment in order to compromise user information. For instance, a bad actor may attempt to mimic or change a portion of a simulated environment used to input personal information (e.g., login credentials for access to an application, account, or the like) in an effort to obtain this personal information. Users are generally unable to reliably identify whether a given simulated environment should or should not be trusted. Previous technology not only fails to recognize these problems but also fails to provide any means for proactively detecting and responding to potentially malicious content in simulated environments.

Certain embodiments of this disclosure solve the previously unrecognized problems described above as well as other technical problems of previous technology by monitoring a simulated environment, detecting possible anomalies based in changes in a simulated environment over time, and proactively addressing any detected anomalies. For example, the disclosed systems provide several technical advantages over previous technology, which include: (1) detecting anomalous content in simulated environments, which may have been modified by a bad actor in an attempt to mislead users and obtain user information; (2) proactive blocking and/or tagging of anomalous content (e.g., objects presented in the simulated environment and/or scripts executed in the simulated environment) to prevent compromise of user information; and (3) automatic alerting of users and/or administrators such that corrective action can be taken to address any detected anomalous content in a simulated environment. As such, this disclosure may improve the function of computer systems used to host virtual reality-based applications for presenting simulated environments. The simulated environment monitor described in this disclosure may ensure any information exposed by the user and/or actions taken by the user is secure while the user interacts with a simulated environment. This disclosure may particularly be integrated into a practical application of a monitoring system or application for a cloud-hosted simulated environment. The monitoring system automatically detects anomalous content in a simulated environment and takes preventive and/or corrective action to reduce or eliminate opportunities for the compromise of user information. The detection and proactive correction of anomalous content in a cloud-hosted simulated environment may be particularly beneficial because cloud-hosted simulated environments may be more susceptible to malicious activity and/or may be considered higher value targets to bad actors.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technology lacks tools for efficiently and reliably monitoring simulated environments in order to ensure user information is secure. This disclosure solves the previously unknown problem associated with the potential vulnerability of simulated environments to alteration and/or mimicry by bad actors seeking to obtain user information which may be exposed during use of a simulated environment. A simulated environment monitor keeps track of how a simulated environment is rendered over a period of time and extracts features associated with objects presented in the simulated environment and/or events occurring in the simulated environment over the period of time. Anomalous content (e.g., objects that have an appearance or other characteristics that change over time, objects which respond unexpectedly to user interaction, and/or scripts that perform unexpected or potentially malicious tasks) is detected, and controls rules are provided to alter how the simulated environment is presented in order to reduce or eliminate exposure to malicious content (e.g., by preventing display and/or execution of anomalous content, providing an alert to the user of anomalous content, and/or providing a message to an administrator to review content and take corrective action).

Simulated Environment Monitoring System

Figure 1:
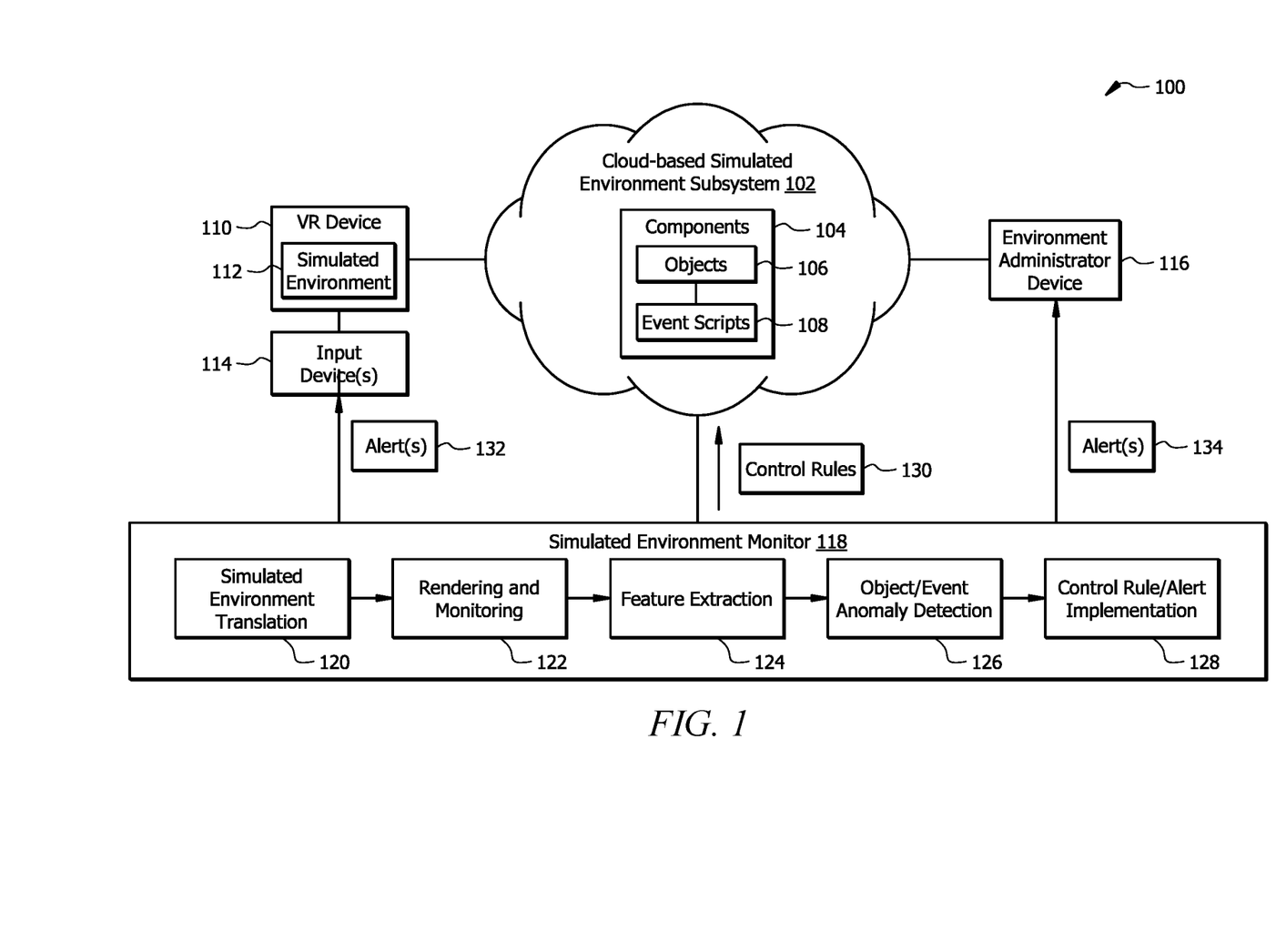
FIG. 1 is a schematic diagram of an example system configured for monitoring a simulated environment.

FIG. 1 is a schematic diagram of an example system 100 for monitoring a simulated environment 112, which may be presented on a simulated environment presentation device 110. The system 100 generally facilitates the efficient detection of components 104, such as objects 106 rendered in the simulated environment 112 and/or event scripts 108 executed in the simulated environment, that are anomalous. The system 100 includes a cloud-based simulated environment subsystem 102, a simulated environment presentation device 110, an environment administrator device 116, and a simulated environment monitor 118. The simulated environment monitor 118 is generally configured to detect changes or anomalies in the components 104 of a simulated environment 112 over time. Such changes or anomalies may be associated with objects 106 appearing in a simulated environment 112 with a changed or unexpected appearance and/or event scripts 108 executing in a simulated environment 112 to perform unexpected or potentially malicious tasks, as described in greater detail below. The simulated environment monitor 118, after detecting such changes or anomalies, may provide updated control rules 130, which instruct the simulated environment subsystem 102 to alter how the simulated environment 112 is presented. For example, the control rules 130 may cause the simulated environment subsystem 102 to tag, obscure, and/or remove anomalous objects 106 to reduce user interaction with such objects (see the example of FIG. 3, described below). The control rules 130 may also or alternatively alter or deactivate event scripts 108 to prevent potentially malicious tasks from executing. The simulated environment monitor 118 may also provide alerts 132, 134 for presentation by the device 110 (e.g., to alert a user of the device 110 of potentially anomalous components 104 of the simulated environment 112) and/or to the environment administrator device 116 (e.g., to alert an administrator of potentially anomalous components 104 of the simulated environment 112).

Figure 3:
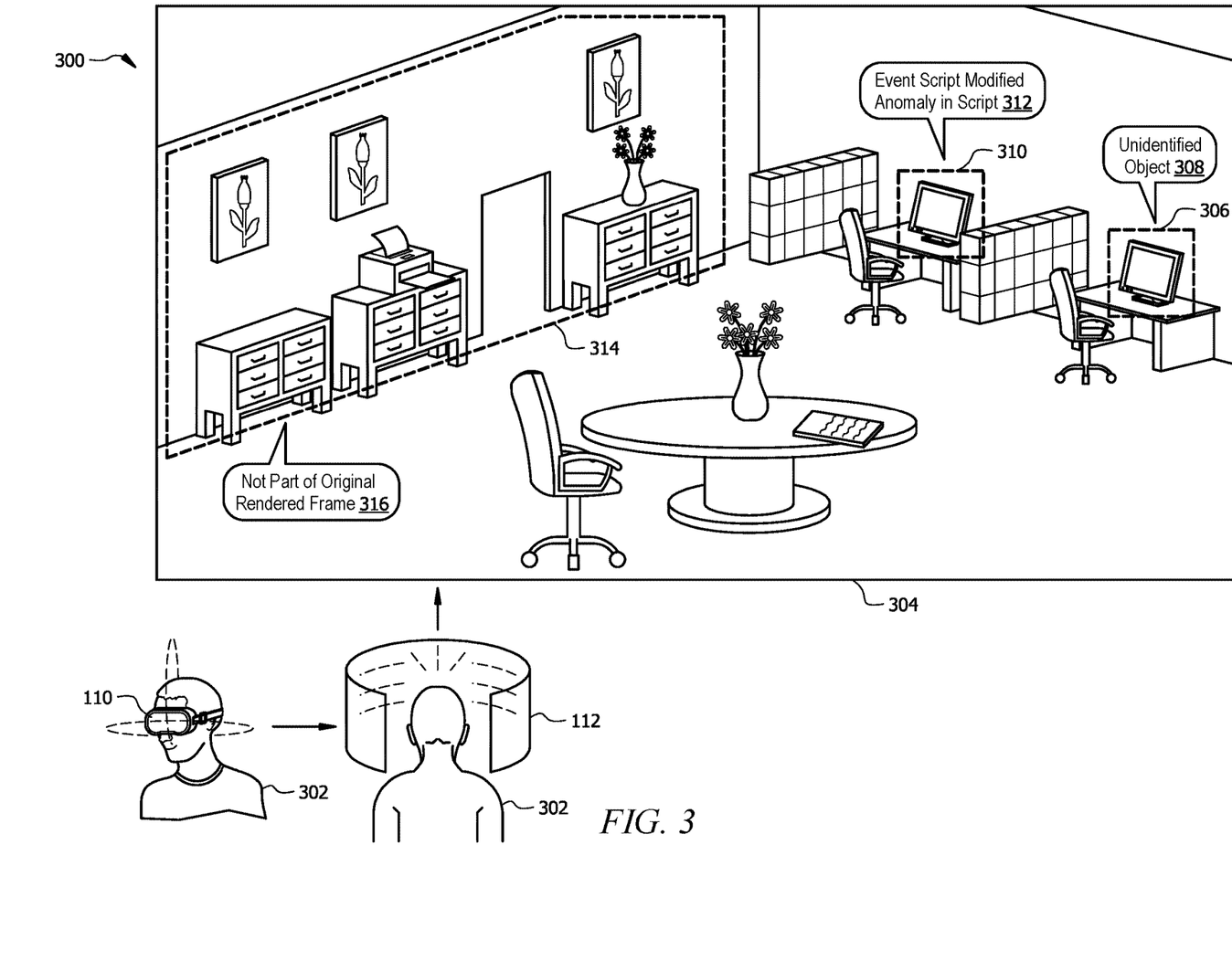
FIG. 3 is a diagram depicting use of a virtual reality device and an example rendering of a simulated environment based on anomalous content detected by the simulated environment monitor of FIG. 1.
Figure 5:
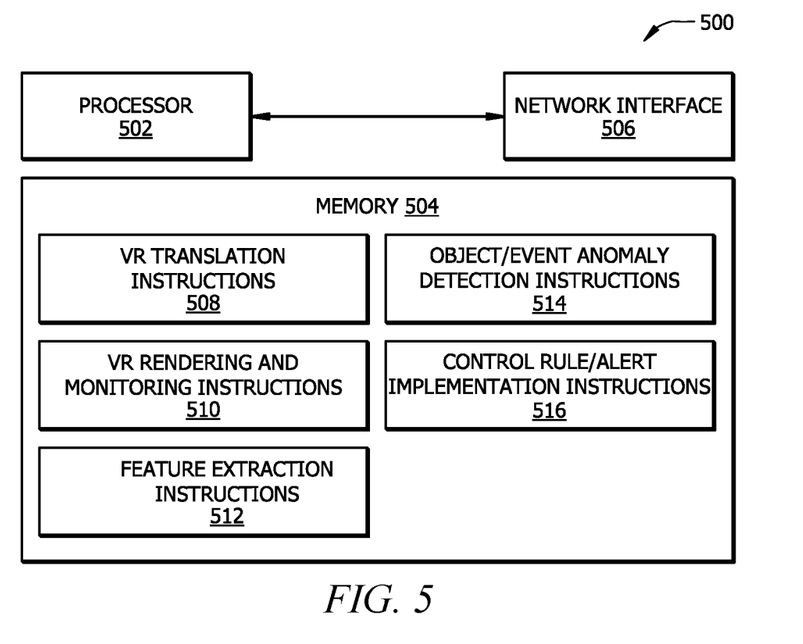
FIG. 5 is a diagram of an example device configured to implement various components of the system of FIG. 1.

The cloud-based simulated environment subsystem 102 may be any computing device or collection of computing devices (e.g., a collection of devices implemented as a server, a virtual server, or the like). An example of a device 500 for implementing the cloud-based simulated environment subsystem 102 is shown in FIG. 5 and described in greater detail below. The simulated environment subsystem 102 is in communication with the simulated environment presentation device 110, the environment administrator device 116, and the simulated environment monitor 118. The simulated environment subsystem 102 generally includes instructions for presenting a simulated environment 112 on the device 110. These instructions include the components 104 of the simulated environment 112. The components 104 include objects 106 that are presented in the simulated environment 112. The objects 106 may be representations of items, people, spaces, and/or the like. FIG. 3 shows an example rendering of a portion 304 of simulated environment 112 that includes presentation of objects 106 such as tables, chairs, and computer terminals. The objects 106 generally include anything that can be visualized in the simulated environment 112. The components 104 may also include event scripts 108. The event scripts 108 generally include code or other instructions for implementing tasks when a user interacts with an object 106 within the simulated environment 112. For example, an event script 108 may execute when a user provides an input to touch an object 106.

The simulated environment presentation device 110 may be any virtual reality device. An example of such a device 110 is illustrated in FIG. 3. The device 110 may include the processor, memory, and interface of the device 500 described below with respect to FIG. 5. Device 110 also includes a display, such as the head-mounted display illustrated in FIG. 3. Device 110 is in communication with the simulated environment subsystem 102 and is configured to display a rendering of the simulated environment 112 based on the components 104 provided by the simulated environment subsystem 102. The rendering of the simulated environment 112 in virtual space and in time is described in greater detail with respect to the examples of FIGS. 2 and 3 below. The simulated environment rendering device 110 may be in communication with an input device 114, which facilitates user input corresponding to movement within and interactions with the simulated environment 112. For example, the input device 114 may be a keyboard, a mouse, a joystick, a gamepad, or any other type of suitable input device. Input(s) provided from the input device 114 may cause one or more of the event scripts 108 to execute, such as when the user interacts with an object 106 within a region of the simulated environment 112, as described in greater detail below.

Simulated environment administrator device 116 is generally any device that is configured to adjust the configuration of the simulated environment subsystem 102. The administrator device 116 may include the processor, memory, and interface of the device 500 described below with respect to FIG. 5. For example, the simulated environment administrator device 116 may be operated by an administrator or programmer of the simulated environment subsystem 102 to design and/or adjust the components 104 of the simulated environment 112. The simulated environment administrator device 116 may be in communication with the simulated environment monitor 118, such that the simulated environment administrator device 116 can receive alert(s) 134 from the simulated environment monitor 118. The simulated environment administrator device 116 may take corrective actions based on such alert(s) 134 (e.g., by removing unauthorized or malicious changes to the components 104). In some cases, the administrator device 116 may have administrative privileges of all aspects of the simulated environment 112. However, in some cases, the administrator device 116 may have administrative privileges over only a portion of the simulated environment 112 (e.g., of a portion of the components 104). In such cases, other portions of the simulated environment 112 (e.g., of the components 104) may be configured by other entities. For example, a given administrator device 116 may have administrative privileges for configuring a virtual store, bank, or the like within a larger publicly accessible simulated environment 112 operated by a third party. Such scenarios may present additional opportunities for compromise of the simulated environment subsystem 102 and for the possible introduction of malicious components 104 in the simulated environment 112 (e.g., objects 106 and/or event scripts 108, which have been modified or added by a bad actor in an attempt to compromise user data), because a large number of different entities and users may have access to the simulated environment subsystem 102. The simulated environment monitor 118 described below facilitates the detection and proactive correction of components 104 of a simulated environment 112 which may have been altered for a malicious purpose.

The simulated environment monitor 118 may be any computing device or collection of computing devices (e.g., a collection of devices implemented as a server, a virtual server, or the like). The simulated environment monitor 118 may be implemented using the processor, memory, and interface of the device 500 described with respect to FIG. 5 below. While shown as a separate device in the example of FIG. 1, all or a portion of the functions of the simulated environment monitor 118 may be implemented using hardware (e.g., the processor, memory, and network interface—see FIG. 5) of the simulated environment subsystem 102. The simulated environment monitor 118 is in communication with the simulated environment subsystem 102 and devices 110, 116. As described in greater detail below with respect to FIGS. 2-3, the simulated environment monitor 118 generally monitors the rendering of the simulated environment 112 over a period of time, performs feature extraction 124 to determine features associated with objects 106 presented in the rendering of the simulated environment 112 over the period of time, performs anomaly detection 126 to detect anomalous components 104 based on changes in features over time, and performs control rule/alert implementation 128 in order to provide control rules 130 which cause the simulated environment subsystem 102 to modify the rendering of the simulated environment 112, such that anomalous objects 106 are identified or blocked (see FIG. 3) and/or anomalous event scripts 108 are deactivated.

In an example operation of the system 100, a user operates the simulated environment presentation device 110 and input device 114 to view and interact with a simulated environment 112. The simulated environment 112 is presented based on the components 104 defined by the simulated environment subsystem 102. For example, objects 106 presented in the simulated environment 112 are determined based on the current region within the simulated environment 112 that the user is viewing (e.g., based on the virtual orientation of the user within the simulated environment 112). An example of a view of a portion 304 of a simulated environment 112 is shown in FIG. 3, which is described below.

The simulated environment monitor 118 may perform simulated environment translation 120 in order to convert information about the simulated environment 112 into a standardized format. A range of simulated environment presentation devices 110 (e.g., virtual reality devices) are currently available, and each type of device 110 may use a different data format for simulated environment 112 presentation and interaction. For example, each manufacturer may use its own unique operating system and data format for rendering a simulated environment 112. Simulated environment translation 120 allows the simulated environment monitor 118 to monitor simulated environments 112 designed to be presented on any type of simulated environment presentation device 110, such that the simulated environment monitor 118 is not limited to a single device ecosystem.

The simulated environment monitor 118 performs rendering and monitoring 122 of the rendered simulated environment 122 over a period of time. Rendering and monitoring 122 generally involves the determination and, optionally, recording of properties of the simulated environment 112 over a period of time. For example, the simulated environment monitor 118 may generate its own rendering of the simulated environment 122. During this rendering and monitoring 122, the simulated environment monitor 118 may perform feature extraction 124. Feature extraction 124 involves the determination of features of objects 106 in the simulated environment 112 over time. Features of objects 106 may indicate or be a measure of the position of objects 106, rotational angles of objects 106, a size scaling of objects 106, a dimension of objects 106, a virtual mass assigned to objects 106, a virtual friction assigned to objects 106, a pixel density of objects 106, a color of objects 106, a shading of objects 106, a texture of objects 106, a lighting of objects 106, and the like. Feature extraction 124 may also or alternatively involve the determination of features of event scripts 108, such as the type of information collected and/or transmitted during execution of an event script 108.

The simulated environment monitor 118 uses the features determined over time using feature extraction 124 to perform anomaly detection 126. Anomaly detection 126 generally involves the detection of changes in features between an initial, or baseline, time point and a later time point. Such changes may be put in place for a malicious purpose, such as to obtain personal information from the user of the simulated environment presentation device 110. Such a change may be indicative of an anomalous, or potentially malicious, component 104. The simulated environment monitor 118 then performs control rule/alert implementation 128 to provide control rules 130 and/or alert(s) 132, 134 in order to modify the presentation of the rendered simulated environment 112 by device 110, such that anomalous components 104 are automatically flagged and/or removed. Examples of feature extraction 124, anomaly detection 126, and control rule/alert implementation 128 are described in greater detail with respect to FIG. 2 below.

Figure 2:
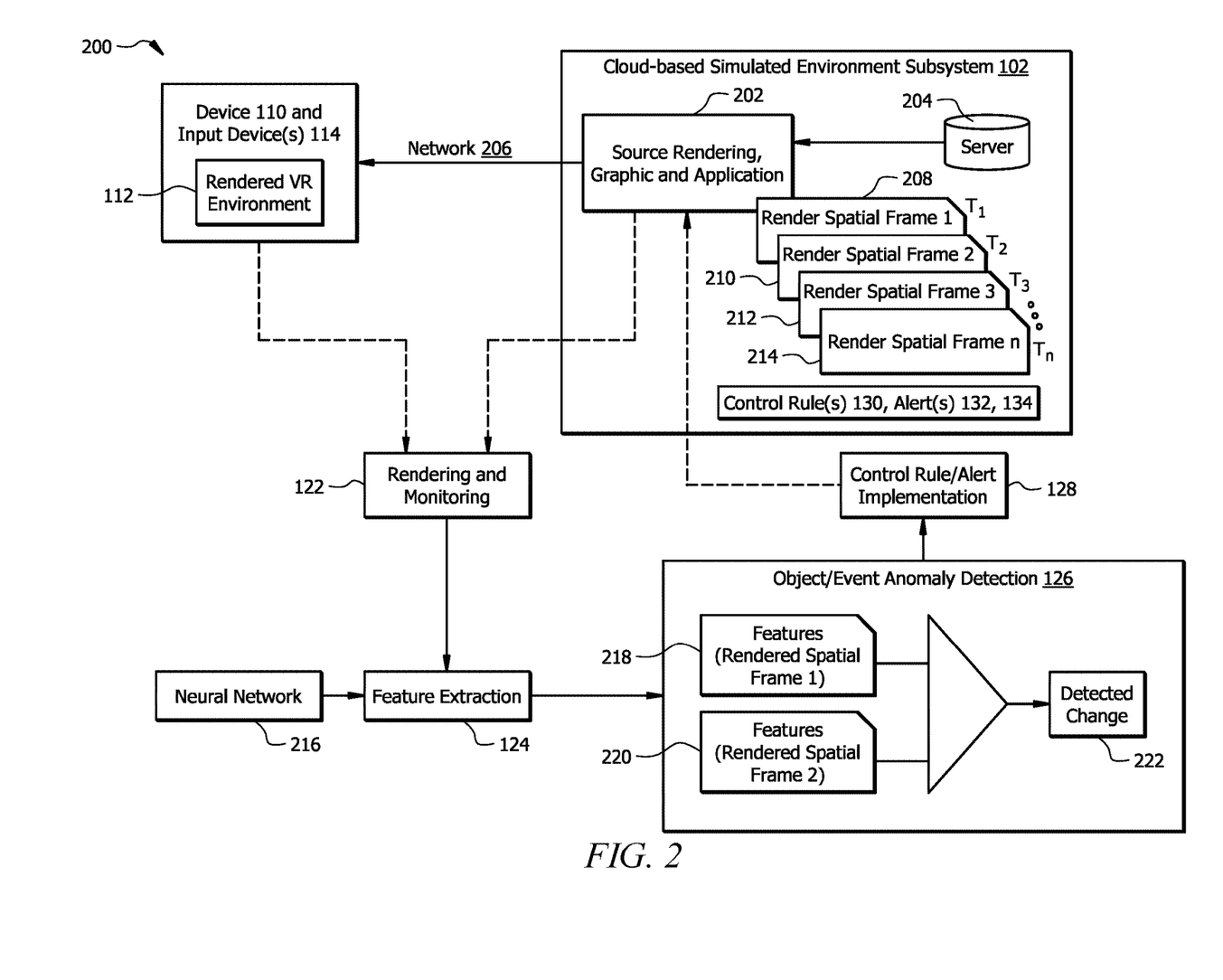
FIG. 2 is a flow diagram illustrating example operation of the system of FIG. 1.

FIG. 2 is a flow diagram 200 illustrating an example operation of the simulated environment subsystem 102 and the simulated environment monitor 118. As shown in FIG. 2, the simulated environment subsystem 102 includes source rendering instructions 202, which are used by the simulated environment presentation device 110 for rendering the simulated environment 112. The source rendering instructions 202 may be provided to the simulated environment presentation device 110 via a network 206. Network 206 may include any interconnecting system capable of transmitting audio, video, signals, data, messages, or any combination of the preceding. Network 206 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the simulated environment subsystem 102 and the simulated environment presentation device 110.

The source rendering instructions 202 may use information stored in a database or server 204 to determine which frames 208, 210, 212, 214 should be rendered in the simulated environment 112 at any given time. FIG. 3 illustrates an example operation of a simulated environment presentation device 110 for rendering a simulated environment 112 based on such instructions 202. A user 302 wears the simulated environment presentation device 110, and depending, in this example, on the positioning of the user's head, a different portion of the simulated environment 112 is presented in the display of the device 110. FIG. 3 also shows an example portion 304 of the simulated environment 112 that corresponds to a given orientation of the head of the user 302. Referring to FIG. 2 along with FIG. 3, the frames 208, 210, 212, 214 correspond to the different views that may be presented in the display of the simulated environment presentation device 110 at different times. These frames 208, 210, 212, 214 may be based in part on information received from an input device 114 and/or on the orientation of the head of the user 302, as described above. For example, if an input is provided to make the user turn around (e.g., whether based on head motion or control provided to another input device 114), the frames 208, 210, 212, 214 will be adjusted or selected to simulate this turning motion in the simulated environment 112 by presenting different views within the simulated environment 112.

Referring to FIG. 2, the simulated environment monitor 118 performs rendering and monitoring 122 of the simulated environment 112 and, optionally translation 120 (not shown in FIG. 2 for conciseness), as described above with respect to FIG. 1. Feature extraction 124 of the components 104 of the monitored simulated environment 112 may be performed in each rendered spatial frame 208, 210, 212, 214, or feature extraction 124 may be performed at intervals or intermittently. Feature extraction 124 may be performed using a neural network 216 which is trained to detect and quantify features 218, 220 of components 104 of the simulated environment 112. For example, the neural network 216 may be trained to determine features 218, 220 of objects 106 and/or event scripts 108 that are shown, through testing, to be effective for determining a detected change 222 (described below).

Feature extraction 124 may involve the determination of features 218, 220 of objects 106. Such object features 218, 220 may include positional characteristics of objects 106 presented in a rendering of the simulated environment 106 (e.g., virtual coordinates of the objects 106 in the simulated environment 112). Features 218, 220 may include rotational angles of objects 106 presented in the rendering of the simulated environment 112. The features 218, 220 may include a scaling of the objects 106 presented in the rendering of the simulated environment 112 (e.g., a relative size of objects 106 compared to the sizes of other objects 106 presented in the simulated environment 112). The features 218, 220 may include a dimension of an object 106 presented in the rendering of the simulated environment 112 (e.g., a virtual size, such as a length, width, height, radius, etc., of an object 106 of a given object type). The features 218, 220 may include a virtual mass assigned to an object 106 presented in the rendering of the simulated environment 112. The features 218, 220 may include a virtual friction assigned to the objects 106 presented in the rendering of the simulated environment 112. The features 218, 220 may include a pixel density of the objects 106 presented in the rendering of the simulated environment 112. The features 218, 220 may include a color of the objects 106 presented in the rendering of the simulated environment 112. The features 218, 220 may include a shading of the objects 106 presented in the rendering of the simulated environment 112. The features 218, 220 may include a texture of the objects 106 presented in the rendering of the simulated environment 112. The features 218, 220 may include a lighting property of the objects 106 presented in the rendering of the simulated environment 112.

The features 218, 220 may be associated with event scripts 108 executed in the simulated environment 112. For example, features 218, 220 may be an indication of tasks that are executed by an event script 108 and/or information communicated during these executed tasks. For example, an event script feature 218, 220 may be an indication of an amount of personal information collected and/or transmitted by the event script 108. For instance a feature 218, 220 may indicate (e.g., as a binary, or yes/no value) whether personal information of a user 302 is collected and/or transmitted when instructions included in an event script 108 are executed. As described further below, if initial features 218 indicate personal data is not collected and/or transmitted and later features 220 indicate that personal data is collected and/or transmitted, then a detected change 222 may be identified, as described further below with respect to anomaly detection 126. The features 218, 220 may be associated with event scripts 108 that control how objects 106 respond to interactions with the user 302.

After the simulated environment monitor 118 determines features 218, 220 at different times, anomaly detection 126 is performed by comparing initial features 218 from an earlier time point to features 220 determined at a later time point. For example, the initial features 218 may be baseline features extracted at a time when the simulated environment 112 was known to be in an administrator-approved state. For example, the initial features 218 may be determined soon after the components 104 of the simulated environment 112 are configured by the administrator (e.g., initially or following approved updates to the simulated environment 112).

As an example, the simulated environment monitor 118 may determine a baseline feature 218 (e.g., a baseline value for the feature 218) at an initial time point. The simulated environment monitor 118 may compare a subsequent feature 220 (e.g., for the same feature of the object 106 or event script 108), which is determined at a subsequent time after the initial time, to the baseline feature 218 to determine if there is a detected change 222. A detected change 222 may correspond to the identification of an anomaly in the simulated environment 112. For instance, if the difference in the features 218 and 220 is at least a threshold value (e.g., a threshold included in instructions 514 of FIG. 5), the control monitor 118 may determine a detected change 222. A detected change 222 may involve any feature type for an object 106 and/or event script 108. As an example, if an assigned mass or friction factor of a given object 106 changes over time, a detected change 222 may be determined. As another example, if the tasks executed by an event script 108 change over time, a detected change 222 may be determined.

Detected changes 222 are used by the simulated environment monitor 118 for control rule/alert implementation 128. For instance, if a detected change 222 is a difference in features 218, 220 of an object 106, the control rules 130 may alter the presentation of the object 106 in the rendering of the simulated environment 112. In some embodiments, the control rules 130 alert(s) 132 may cause display of an alert message (see, e.g., alert messages 308 and 316 in FIG. 3) proximate the object 106 for which there was a detected change 222. The control rules 130 may also or alternatively prevent presentation of a region (e.g., region 306 or 314 of FIG. 3) of the rendering of the simulated environment 112 associated with the object 106 associated with the detected change. Alert(s) 134 may be provided to the administrator device 114 and provide an indication of the detected change 222 (i.e., of a detected anomaly in the simulated environment 112), such appropriate corrective actions can be taken in a timely manner.

As another example, a detected change 222 may correspond to a difference in features 218, 220 of an event script 108 that has changed over time. For example, the detected change 222 may be to an event script 108 that is executable when a user interacts with a script-execution region (e.g., region 310 of FIG. 3) of the rendering of the simulated environment 112. In response to such a detected change 222 in an event script 108, the control rules 130 may cause the rendering of the simulated environment 112 to be modified to identify the script-execution region 310 of the rendering of the simulated environment 112. As shown in FIG. 3, such a region 310 is identified by alert 312. The control rules 130 may also or alternatively prevent the event script 108 associated with the detected change 222 from being executing in the simulated environment 112. For example, referring to the example of FIG. 3, if a user 302 attempts to interact with the simulated computer monitor presented in region 310, an event script 108 that executes in response to user interaction in this region 310 will not be executed.

As yet another example, a detected change 222 may correspond to a difference in features 218, 220 of an event script 108 that has changed over time, where the event script 108 provides instructions for a response to a user input. For instance, the simulated environment monitor 118 may determine a detected change 222 in features 218, 220 associated with how objects 106 respond to interactions between the user 302 of the simulated environment presentation device 110 (e.g., through inputs provided via an input device 114) and an object 106 in the simulated environment 112. For example, if an object 106 moves in response to the user 302 providing an input for simulating contact with the object 106 at an initial or baseline time, but the object 106 no longer moves in response to the same input at a later time, a detected change 222 in associated features 218, 220 may be determined. The detected change 222 may correspond to a response anomaly (i.e., to an anomaly in how an object 106 responds to a simulated interaction with the object 106). In response to the detected change 222, control rules 130 may cause the object 106 that is associated with the detected change (i.e., the object 106 with the response anomaly) to be identified. For example, the anomaly identified by alert 312 in FIG. 3 may be associated with such a detected change 222.

Example Methods of Operation

Figure 4:
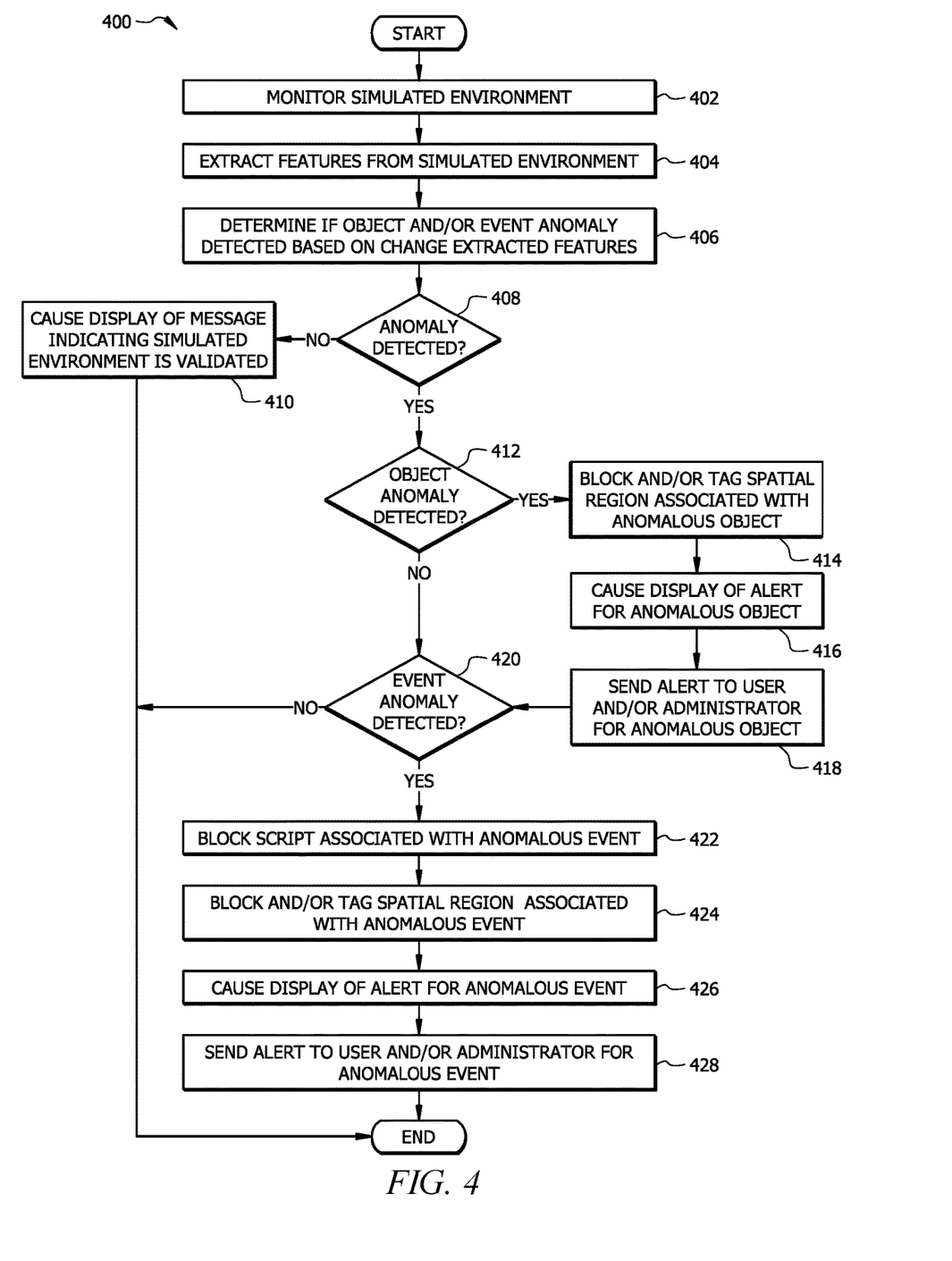
FIG. 4 is a flowchart of a method for operating the system of FIG. 1.

FIG. 4 illustrates a method 400 for operating the simulated environment monitor 118 described with respect to FIGS. 1-3 above. The method 400 may begin at step 402 where the simulated environment monitor 118 monitors the simulated environment 112 rendered on the simulated environment presentation device 110. For example, the simulated environment monitor 118 may receive data used to display frames 208, 210, 212, 214 to the user 302 of the simulated environment presentation device 110. Monitoring may involve determining and recording properties of the simulated environment 112 over a period of time. For example, the simulated environment monitor 118 may generate its own rendering of the simulated environment 122 to monitor the simulated environment 112. As described above, in some embodiments, simulated environment translation 120 may be performed to convert information about the rendered simulated environment 112 into a standardized format that is usable by the simulated environment monitor 118. Simulated environment translation 120 may facilitate the monitoring of simulated environments 112 that are intended for a range of available simulated environment presentation devices 110.

At step 404, the simulated environment monitor 118 extracts features (e.g., features 218, 220) from the simulated environment 112. For example, the simulated environment monitor 118 may perform feature extraction 124, as described above with respect to FIGS. 1 and 2. Feature extraction 124 involves the determination of features 218, 220 of objects 106 in the simulated environment 112 over time. Features 218, 220 of objects 106 may indicate or be a measure of the position of objects, rotational angles of objects, a size scaling of objects, a dimension of objects, a virtual mass assigned to objects, a virtual friction assigned to objects, a pixel density of objects, a color of objects, a shading of objects, a texture of objects, a lighting of objects, and the like. Feature extraction 124 may also or alternatively involve the determination of features 218, 220 of event scripts 108, such as the type of information collected and/or transmitted during execution of an event script 108.

At step 406, the simulated environment monitor 118 determines if an anomaly is detected based on a detected change 222 in one or more of the extracted features 218, 220 (see anomaly detection 126 of FIGS. 1 and 2, described above). For example, anomaly detection 126 generally involves the detection of changes in features 218, 220 between an initial, or baseline, time point and a later time point (e.g., the determination of detected change 222 between features 218, 220 of FIG. 2).

At step 408, the simulated environment monitor 118 is directed to step 410 if an anomaly is not detected at step 406 (e.g., if there is no detected change 222 determined). At step 410, the simulated environment monitor 118 may cause display within the simulated environment 112 of a message (e.g., similar to one of the messages 308, 312, 316 of FIG. 3 but containing some variation of the message "THIS SIMULATED ENVIRONMENT HAS BEEN VALIDATED") indicating that the simulated environment 112 is validated. Such a message may provide assurance to the user 302 that the simulated environment 112 does not contain anomalous components 104 which may be associated with malicious content.

At step 408, the simulated environment monitor 118 is alternatively directed to step 412 if an anomaly is detected at step 406. At step 412, the simulated environment monitor 118 determines if an object anomaly is detected (i.e., if a detected change 222 corresponds to a change in object features 218, 222 of FIG. 2). If an object anomaly is detected, the simulated environment monitor 118 proceeds to step 414. At step 414, the simulated environment monitor 118 may tag or block presentation of a region of the simulated environment 212 associated with the anomalous object 106. For example, a region 306, 310, 314 of FIG. 3 may be tagged (e.g., outlined as shown in FIG. 3). As another example, a region 306, 310, 314 of FIG. 3 may be blocked or visually obscured, such that the user 302 cannot interact with the anomalous object 106 within the region 306, 310, 314. At step 416, the simulated environment monitor 118 may cause display of an alert 132 (e.g., an alert message 308, 312, 316 of FIG. 3). Such an alert 132 may aid the user 302 in deciding whether to interact with a possibly anomalous object 106. At step 418, the simulated environment monitor 118 may transmit an alert 132 to the user 302 of simulated environment presentation device 110 and/or an alert 134 to the administrator device 116, such that appropriate parties are informed of the anomalous component 104 detected at step 406.

If an object anomaly is not detected at step 412, the simulated environment monitor 118 proceeds to step 420. At step 420, the simulated environment monitor 118 determines if an event anomaly is detected (e.g., whether a detected change 222 from step 406 corresponds to a change in features 218, 220 associated with an event script 108). If an event anomaly is not detected, the process 400 generally ends. If an event anomaly is detected, the simulated environment monitor 118 proceeds to step 422.

At step 422, the simulated environment monitor 118 prevents the event script 108 associated with the detected change 222 from being executed in the simulated environment 112. For example, the simulated environment monitor 118 may provide control rules 130 which instruct the simulated environment subsystem 102 to adjust the event script 108 such that at least the anomalous portion of the event script 108 is not executed.

At step 424, the simulated environment monitor 118 may tag or block presentation of a region of the simulated environment 212 associated with the anomalous event script 108. For example, a region 306, 310, 314 of FIG. 3 may be tagged (e.g., outlined as shown in FIG. 3). As another example, a region 306, 310, 314 of FIG. 3 may be blocked or visually obscured, such that the user 302 cannot cause an anomalous event script 108 to execute in the region 306, 310, 314. At step 426, the simulated environment monitor 118 may cause display of an alert 132 (e.g., an alert message 308, 312, 316 of FIG. 3). Such an alert 132 may aid the user 302 in deciding whether to interact with a possibly anomalous event script 108. At step 428, the simulated environment monitor 118 may transmit an alert 132 to the user 302 of simulated environment presentation device 110 and/or an alert 134 to the administrator device 116, such that appropriate parties are informed of the anomalous component 104 detected at step 406.

Example Device for API Integration

FIG. 5 illustrates an embodiment of a device 500 configured to implement various components of the system 100. One or more devices 500 may be used to implement the simulated environment subsystem 102, simulated environment presentation device 110, administrator device 116, and/or the simulated environment monitor 118 of FIG. 1. The device 500 includes a processor 502, a memory 504, and a network interface 506. The device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504 and the network interface 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2 and the method 300 of FIG. 3. In some embodiments, the function described herein is implemented using logic units, FPGAs, ASICs, DSPs, or any other suitable hardware or electronic circuitry.

The memory 504 is operable to store any of the information described above with respect to FIGS. 1-3 along with any other data, instructions, logic, rules, or code operable to execute the function described herein. For example, the memory 504 may store the components 104, control rules 130, alerts 132, 134, and features 218, 220, described above with respect to FIGS. 1-3. The memory 504 may also store translation instructions 508, which include any logic, code, and/or rules for implementing simulated environment translation 120 functions of the simulated environment monitor 118, described above with respect to FIGS. 1-3. The memory 504 may also store rendering and monitoring instructions 510, which include any logic, code, and/or rules for implementing rendering and monitoring 122 functions of the simulated environment monitor 118, described above with respect to FIGS. 1-3. The memory 504 may also store feature extraction instructions 512, which include any logic, code, and/or rules for implementing feature extraction 124 functions (e.g., including for training and implementing the neural network 216) of the simulated environment monitor 118, described above with respect to FIGS. 1-3. The memory 504 may also store anomaly detection instructions 514, which include any logic, code, and/or rules (e.g., thresholds) for implementing anomaly detection 126 functions of the simulated environment monitor 118 (e.g., including determining detected changes 222 of FIG. 2), described above with respect to FIGS. 1-3. The memory 504 may also store control rule/alert implementation instructions 516, which include any logic, code, and/or rules for implementing control rule/alert implementation 128 functions of the simulated environment monitor 118, described above with respect to FIGS. 1-3. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While the examples described in this disclosure primarily described a simulated environment 112 that is a virtual reality environment, it should be understood that the systems, methods, and device may be used to detect and proactively address anomalies in augmented reality (AR) environments and hybrid of virtual and augmented reality (XR) environments. For example, the simulated environment presentation device 110 may be an augmented reality (AR) device or a hybrid augmented-virtual reality (XR) device.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a simulated environment presentation device comprising a display configured to present a rendering of a simulated environment;
a cloud-based simulated environment subsystem communicatively coupled to the simulated environment presentation device and configured to provide instructions for rendering the simulated environment; and
a simulated environment monitoring device comprising at least one processor communicatively coupled to the cloud-based simulated environment subsystem, the at least one processor configured to:
monitor the rendering of the simulated environment over a period of time; determine object features associated with objects rendered in the simulated environment over the period of time, wherein the objects rendered are simulated objects in the simulated environment;
detect a change in a determined first feature of a first rendered object over the period of time;
identify the detected change as an anomaly associated with the first rendered object; and
in response to detecting the anomaly associated with the first rendered object, cause the cloud-based simulated environment subsystem to modify the rendering of the simulated environment to identify the first rendered object as an anomalous object and to perform one or more of the following:
obscuring the first rendered object in the rendering of the simulated environment;
preventing presentation of the first rendered object in the rendering of the simulated environment; and
preventing presentation of a region of the rendering of the simulated environment associated with the first rendered object; and
wherein the at least one processor is further configured to:
determine event features associated with scripts executed in the simulated environment over the period of time;
detect an event anomaly associated with a first script based on a change in a determined first event feature of the first script over the period of time, wherein the first script is executable when a user interacts with a script-execution region of the rendering of the simulated environment; and
in response to detecting the event anomaly, causing the cloud-based simulated environment subsystem to modify the rendering of the simulated environment to identify the script-execution region of the rendering of the simulated environment.

2. The system of claim 1, wherein the object features comprise one or more of positional characteristics of the objects rendered in the simulated environment, rotational angles of the objects rendered in the simulated environment, a scaling of the objects rendered in the simulated environment, a dimension of the objects rendered in the simulated environment, a virtual mass assigned to the objects rendered in the simulated environment, a virtual friction assigned to the objects rendered in the simulated environment, a pixel density of the objects rendered in the simulated environment, a color of the objects rendered in the simulated environment, a shading of the objects rendered in the simulated environment, a texture of the objects rendered in the simulated environment, and a lighting property of the objects rendered in the simulated environment.

3. The system of claim 1, wherein the at least one processor is further configured to detect the anomaly associated with the first rendered object by:
determining a baseline value of the first feature at an initial time point in the period of time;
comparing a subsequent value of the first feature at a subsequent time after the initial time to the baseline value of the first feature; and
determining, based on the comparison of the subsequent value to the baseline value of the first feature, that the first feature has changed by at least a threshold amount.

4. The system of claim 1, wherein the at least one processor is further configured to perform one or more of the following in response to detecting the anomaly associated with the first rendered object:
cause display of an alert message proximate the first rendered object in the rendering of the simulated environment;
and
send an alert to an administrator of the simulated environment subsystem indicating the detected anomaly associated with the first rendered object.

5. The system of claim 1, wherein the at least one processor is further configured to, in response to detecting anomalous script, prevent the first script from executing in the simulated environment.

6. The system of claim 1, wherein:
the system further comprises a user input device communicatively coupled to the simulated environment presentation device and configured to provide an indication of a user input corresponding to interactions between a user of the simulated environment presentation device and objects rendered in the simulated environment; and
the at least one processor is further configured to:
determine, over the period of time, response features associated with how objects respond to the interactions between the user of the simulated environment presentation device and the objects rendered in the simulated environment;

detect a response anomaly based on a change in a first response feature over the period of time, wherein the first response feature corresponds to a response of a second rendered object to a first user input; and in response to detecting the response anomaly, cause the cloud-based simulated environment subsystem to modify the rendering of the simulated environment to identify the second rendered object as having an anomalous response to user inputs.

7. A method, the method comprising:

monitoring, over a period of time, a rendering of a simulated environment presented on a display of a simulated environment presentation device, wherein instructions for rendering the simulated environment are provided by a cloud-based simulated environment subsystem;

determining object features associated with objects rendered in the simulated environment over the period of time, wherein the objects rendered are simulated objects in the simulated environment;

detecting a change in a determined first feature of a first rendered object over the period of time;

identify the detected change as an anomaly associated with the first rendered object; and in response to detecting the anomaly associated with the first rendered object, causing the cloud-based simulated environment subsystem to modify the rendering of the simulated environment to identify the first rendered object as an anomalous object and to perform one or more of the following:

obscuring the first rendered object in the rendering of the simulated environment;

preventing presentation of the first rendered object in the rendering of the simulated environment; and preventing presentation of a region of the rendering of the simulated environment associated with the first rendered object; and the method further comprising:

determining event features associated with scripts executed in the simulated environment over the period of time;

detecting an event anomaly associated with a first script based on a change in a determined first event feature of the first script over the period of time, wherein the first script is executable when a user interacts with a script-execution region of the rendering of the simulated environment; and in response to detecting the event anomaly, causing the cloud-based simulated environment subsystem to modify the rendering of the simulated environment to identify the script-execution region of the rendering of the simulated environment.

8. The method of claim 7, wherein the object features comprise one or more of positional characteristics of the objects rendered in the simulated environment, rotational angles of the objects rendered in the simulated environment, a scaling of the objects rendered in the simulated environment, a dimension of the objects rendered in the simulated environment, a virtual mass assigned to the objects rendered in the simulated environment, a virtual friction assigned to the objects rendered in the simulated environment, a pixel density of the objects rendered in the simulated environment, a color of the objects rendered in the simulated environment, a shading of the objects rendered in the simulated environment, a texture of the objects rendered in the simulated environment, and a lighting property of the objects rendered in the simulated environment.

9. The method of claim 7, further comprising detecting the anomaly associated with the first rendered object by:

determining a baseline value of the first feature at an initial time point in the period of time;

comparing a subsequent value of the first feature at a subsequent time after the initial time to the baseline value of the first feature; and determining, based on the comparison of the subsequent value to the baseline value of the first feature, that the first feature has changed by at least a threshold amount.

10. The method of claim 7, further comprising performing one or more of the following in response to detecting the anomaly associated with the first rendered object:

causing display of an alert message proximate the first rendered object in the rendering of the simulated environment;

and sending an alert to an administrator of the simulated environment subsystem indicating the detected anomaly associated with the first rendered object.

11. The method of claim 7, further comprising:

in response to detecting anomalous script, preventing in response to detecting anomalous script, preventing the first script from executing in the simulated environment.

12. The method of claim 7, further comprising:

determining, over the period of time, response features associated with how objects respond to interactions between a user of the simulated environment presentation device and the objects rendered in the simulated environment, wherein the objects rendered are simulated objects in the simulated environment;

detecting a response anomaly based on a change in a first response feature over the period of time, wherein the first response feature corresponds to a response of a second rendered object to a first user input; and in response to detecting the response anomaly, causing the cloud-based simulated environment subsystem to modify the rendering of the simulated environment to identify the second rendered object as having an anomalous response to user inputs.

13. A device comprising:

an interface providing communication with a cloud-based simulated environment subsystem configured to provide instructions for rendering a simulated environment on a display of a simulated environment presentation device; and at least one processor communicatively coupled to the interface, the at least one processor configured to:

monitor the rendering of the simulated environment over a period of time;

determine object features associated with objects rendered in the simulated environment over the period of time;

detect a change in a determined first feature of a first rendered object over the period of time;

identify the detected change as an anomaly associated with the first rendered object; and in response to detecting the anomaly associated with the first rendered object, cause the cloud-based simulated environment subsystem to modify the rendering of the simulated environment to identify the first rendered object as an anomalous object and to perform one or more of the following:

obscure the first rendered object in the rendering of the simulated environment;

prevent presentation of the first rendered object in the rendering of the simulated environment; and prevent presentation of a region of the rendering of the simulated environment associated with the first rendered object; and, wherein the at least one processor is further configured to:

determine event features associated with scripts executed in the simulated environment over the period of time;

detect an event anomaly associated with a first script based on a change in a determined first event feature of the first script over the period of time, wherein the first script is executable when a user interacts with a script-execution region of the rendering of the simulated environment;

in response to detecting the event anomaly, causing the cloud-based simulated environment subsystem to modify the rendering of the simulated environment to identify the script-execution region of the rendering of the simulated environment; and in response to detecting anomalous script, prevent the first script from executing in the simulated environment.

14. The device of claim 13, wherein the object features comprise one or more of positional characteristics of the objects rendered in the simulated environment, rotational angles of the objects rendered in the simulated environment, a scaling of the objects rendered in the simulated environment, a dimension of the objects rendered in the simulated environment, a virtual mass assigned to the objects rendered in the simulated environment, a virtual friction assigned to the objects rendered in the simulated environment, a pixel density of the objects rendered in the simulated environment, a color of the objects rendered in the simulated environment, a shading of the objects rendered in the simulated environment, a texture of the objects rendered in the simulated environment, and a lighting property of the objects rendered in the simulated environment.

15. The device of claim 13, wherein the at least one processor is further configured to detect the anomaly associated with the first rendered object by:

determining a baseline value of the first feature at an initial time point in the period of time;

comparing a subsequent value of the first feature at a subsequent time after the initial time to the baseline value of the first feature; and determining, based on the comparison of the subsequent value to the baseline value of the first feature, that the first feature has changed by at least a threshold amount.

16. The device of claim 13, wherein the at least one processor is further configured to perform one or more of the following in response to detecting the anomaly associated with the first rendered object:

cause display of an alert message proximate the first rendered object in the rendering of the simulated environment;

and send an alert to an administrator of the simulated environment subsystem indicating the detected anomaly associated with the first rendered object.

17. The device of claim 13, wherein the at least one processor is further configured to:

determine, over the period of time, response features associated with how objects respond to interactions between a user of the simulated environment presentation device and the objects rendered in the simulated environment;

detect a response anomaly based on a change in a first response feature over the period of time, wherein the first response feature corresponds to a response of a second rendered object to a first user input; and in response to detecting the response anomaly, causing the cloud-based simulated environment subsystem to modify the rendering of the simulated environment to identify the second rendered object as having an anomalous response to user inputs.

* * * * *